(12) United States Patent
Shin et al.

(10) Patent No.: US 6,674,637 B2
(45) Date of Patent: *Jan. 6, 2004

(54) PORTABLE COMPUTER EQUIPPED WITH ADD-ON BATTERY

(75) Inventors: Takahiro Shin, Kawasaki (JP); Masuo Ohnishi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,257

(22) Filed: Dec. 17, 1998

(65) Prior Publication Data

US 2002/0149907 A1 Oct. 17, 2002

Related U.S. Application Data

(62) Division of application No. 08/443,441, filed on Apr. 16, 1997.

(30) Foreign Application Priority Data

Oct. 24, 1996 (JP) ............................................. 8-282399

(51) Int. Cl.$^7$ ................................................. G06F 1/16
(52) U.S. Cl. ........................ 361/683; 361/686; 429/98; 710/303
(58) Field of Search ................................. 361/683–687, 361/724–727; 710/303, 304; 429/303, 304, 98, 123

(56) References Cited

U.S. PATENT DOCUMENTS

| 4,680,674 A | 7/1987 | Moore |
| 4,858,162 A | 8/1989 | Kieffer et al. ............. 364/708 |
| 4,893,263 A | 1/1990 | Myers |
| 4,926,365 A | 5/1990 | Hsieh |
| 4,958,889 A | 9/1990 | Boyle et al. |

(List continued on next page.)

FOREIGN PATENT DOCUMENTS

| EP | 0 838 750 A1 | 4/1988 |
| EP | 0 448 053 A2 * | 3/1991 |
| EP | 0 618 525 | 10/1994 |
| JP | 58-33735 | 2/1983 |
| JP | 63-8960 | 1/1988 |

(List continued on next page.)

OTHER PUBLICATIONS

*Patent Abstracts of Japan,* vol. 19, JP 06 043965 A (Hitachi Ltd), Feb. 18, 1994.

Anthony, Robert S., "Desktop PCs still hold a power advantage over mobile units, but these notebooks offer all the power you'll need and more," *PC Magazine,* Jan. 23, 1996, pp. 101–103.

(List continued on next page.)

*Primary Examiner*—Lisa Lea Edmonds
(74) *Attorney, Agent, or Firm*—Staas & Halsey LLP

(57) ABSTRACT

A portable computer includes a portable computer body having an upper surface, a lower surface and a lower front edge thereof. An add-on battery is detachably mounted on the lower surface of the portable computer body and has a wedge-shaped portion corresponding to a wedge-like space which is defined between the lower surface of the portable computer body and a surface on which the portable computer body is placed, when the portable computer body is placed to be inclined about the lower front edge of the portable computer body. The portable computer body is, when it is equipped with the add-on battery, inclined in such a manner that the upper surface of the portable computer body is lower at a front edge thereof.

64 Claims, 7 Drawing Sheets

U.S. PATENT DOCUMENTS

| | | | |
|---|---|---|---|
| 4,978,949 | A | 12/1990 | Herron et al. |
| 4,991,058 | A | 2/1991 | Watkins et al. |
| 5,030,128 | A | 7/1991 | Herron et al. |
| 5,126,954 | A | 6/1992 | Morita |
| 5,153,817 | A | 10/1992 | Hosoi et al. |
| 5,182,699 | A | 1/1993 | Kobayashi et al. |
| 5,186,646 | A | 2/1993 | Pederson |
| 5,187,645 | A | 2/1993 | Spalding et al. |
| 5,196,993 | A | 3/1993 | Herron et al. |
| 5,217,394 | A | 6/1993 | Ho |
| 5,265,238 | A | 11/1993 | Canova, Jr. et al. |
| 5,278,730 | A | 1/1994 | Kikinis |
| 5,290,178 | A | 3/1994 | Ma |
| 5,293,300 | A * | 3/1994 | Leung .......... 361/683 |
| 5,301,334 | A | 4/1994 | Horiuchi |
| 5,311,397 | A | 5/1994 | Harshberger et al. |
| 5,400,055 | A * | 3/1995 | Ma et al. .......... 345/168 |
| 5,410,712 | A | 4/1995 | Okuno |
| 5,411,416 | A | 5/1995 | Balon et al. |
| 5,428,798 | A | 6/1995 | Sekine et al. |
| 5,430,883 | A | 7/1995 | Horiuchi |
| 5,440,748 | A | 8/1995 | Sekine et al. |
| 5,459,637 | A | 10/1995 | Ma et al. |
| 5,460,547 | A | 10/1995 | Belt et al. |
| 5,473,506 | A | 12/1995 | Kikinis |
| 5,475,271 | A | 12/1995 | Shibasaki et al. |
| 5,478,253 | A | 12/1995 | Biechler et al. |
| 5,506,749 | A | 4/1996 | Matsuda |
| 5,522,089 | A | 5/1996 | Kikinis et al. |
| 5,557,562 | A | 9/1996 | Yoshiharu et al. .......... 364/708.1 |
| 5,567,180 | A | 10/1996 | Seo |
| 5,583,744 | A | 12/1996 | Oguchi et al. .......... 361/683 |
| 5,680,625 | A | 10/1997 | Sekine et al. |
| 5,729,478 | A | 3/1998 | Ma et al. |
| 5,764,477 | A | 6/1998 | Ohgami et al. |
| 5,768,100 | A * | 6/1998 | Barrus et al. .......... 361/686 |
| 5,930,517 | A | 7/1999 | Diehl et al. |
| 5,986,991 | A | 11/1999 | Kawahara et al. |
| 6,078,496 | A | 6/2000 | Oguchi et al. |

FOREIGN PATENT DOCUMENTS

| | | |
|---|---|---|
| JP | 63-55655 | 3/1988 |
| JP | 2-73224 | 6/1990 |
| JP | 2-287719 | 11/1990 |
| JP | 3-171312 | 7/1991 |
| JP | 3-223915 | 10/1991 |
| JP | 3-269608 | 12/1991 |
| JP | 3-294917 | 12/1991 |
| JP | 4-617 | 1/1992 |
| JP | 4-10015 | 1/1992 |
| JP | 4-10017 | 1/1992 |
| JP | 4-18617 | 1/1992 |
| JP | 4-077809 | 3/1992 |
| JP | 4-44026 | 4/1992 |
| JP | 4-101207 | 4/1992 |
| JP | 4-101258 | 4/1992 |
| JP | 4-151704 | 5/1992 |
| JP | 4-155417 | 5/1992 |
| JP | 4-155-419 | 5/1992 |
| JP | 4-167012 | 6/1992 |
| JP | 4-195507 | 7/1992 |
| JP | 4-205328 | 7/1992 |
| JP | 4-211-815 | 8/1992 |
| JP | 4-233174 | 8/1992 |
| JP | 4-108218 | 9/1992 |
| JP | 4-115753 | 10/1992 |
| JP | 4-505816 | 10/1992 |
| JP | 4-136721 | 12/1992 |
| JP | 5-23231 | 3/1993 |
| JP | 5-66858 | 3/1993 |
| JP | 5-66864 | 3/1993 |
| JP | 5-66867 | 3/1993 |
| JP | 5-33228 | 4/1993 |
| JP | 5-40917 | 6/1993 |
| JP | 5-225406 | 9/1993 |
| JP | 5-265591 | 10/1993 |
| JP | 5-274058 | 10/1993 |
| JP | 6-4692 | 1/1994 |
| JP | 6-35569 | 2/1994 |
| JP | 6-43965 | 2/1994 |
| JP | 6-138985 | 5/1994 |
| JP | 6-266479 | 9/1994 |
| JP | 7-56661 | 3/1995 |
| JP | 7-84689 | 3/1995 |
| JP | 7-94232 | 4/1995 |
| JP | 7-121518 | 5/1995 |
| JP | 8-007651 | 1/1996 |
| JP | 8-022437 | 1/1996 |
| JP | 8-76898 | 3/1996 |
| JP | 8-076879 | 3/1996 |
| JP | 8-076887 | 3/1996 |
| JP | 8-076889 | 3/1996 |
| JP | 8-076898 | 3/1996 |
| JP | 8-106340 | 4/1996 |
| JP | 8-249242 | 9/1996 |
| JP | 9-62416 | 3/1997 |
| JP | 9-130659 | 5/1997 |
| JP | 9-190241 | 7/1997 |
| JP | 9-212260 | 8/1997 |
| JP | 9-275675 | 10/1997 |
| JP | 9-306451 | 11/1997 |
| JP | 10-84639 | 3/1998 |
| JP | 10-91292 | 4/1998 |
| JP | 10-91293 | 4/1998 |
| JP | 10-116133 | 5/1998 |
| JP | 10-124194 | 5/1998 |
| JP | 11-231969 | 8/1999 |
| WO | WO 90/10925 | 9/1990 |

OTHER PUBLICATIONS

Copy of European Search Report, Ref. No.97304759.0–2212–dated Feb. 17, 1998.

*Patent Abstracts of Japan,* vol. 18, No. 273 (P–1742), May 24, 1994 & JP 06 043965 A (Hitachi Ltd), Feb. 18, 1994.

*Patent Abstracts of Japan,* vol. 96, No. 7, Jul. 31, 1996 & JP 08 076879 A (Citizen Watch Co Ltd), Mar. 22, 1996.

"Integral Distributed Battery Pack for Portable Systems," *Research Disclosure,* No. 333, Jan. 1, 1992, p. 12 (XP000281124).

U.S. patent application Ser. No. 08/843,441, filed Apr. 16, 1997, Takahiro Shin et al., Fujitsu Limited.

"Mobile PC"; Mar. 1996; pp. 102–103.

"ASCII DOS/V ISSUE"; Aug. 1996; p. 210.

"ASCII DOS/V ISSUE"; Sep. 1996; p. 139.

"ASCII"; Jun., 1996; pp. 330–331.

"Mobile PC"; Jul., 1996; pp. 86–87.

"Mobile PC"; Jun., 1996; vol. 2, No. 6, pp. 25–29.

"ASCII"; May, 1996; vol. 20.

U.S. patent application Ser. No. 08/840,462, filed Jun. 30, 1997, Ko Kambayashi et al., Fujitsu Limited.

U.S. patent application Ser. No. 08/885,857, filed Apr. 18, 1997, Takahiro Shin et al., Fujitsu Limited.

\* cited by examiner

PORTABLE COMPUTER EQUIPPED WITH ADD-ON BATTERY

This application is a divisional of application Ser. No. 08/443,441, filed Apr. 16, 1997.

BACKGROUND OF THE INVENTION

1. Field of the Invention

This invention relates to a portable computer, such as a notebook type personal computer, a word processor, and so on. More specifically, this invention relates to a portable computer equipped with an add-on battery which can be removably fitted to the apparatus main body.

As portable computers have become widespread in recent years, improvements in portability, battery life and operability have been required. To improve operability, a keyboard must be inclined. To improve portability, the size and weight of the portable computer must be reduced. To prolong the life of the battery, the battery capacity must be increased. As one of the means for increasing the battery capacity, an add-on battery is removably fitted to the portable computer.

2. Description of Related Art

The prior art technology for tilting the key face of a portable computer includes a technology which fits a turn-down-type tilt stand to a personal computer. According to the turndown-type tilt stand of this prior art, however, a useless space remains between the bottom surface of the portable computer and the desk surface on which the portable computer is put when the tilt stand is turned up. For example, Japanese Unexamined Patent Publication (Kokai) No. 8-76879 discloses a prior art technology which disposes an external memory device in such a space.

Prior art technologies which increase the battery life while improving portability include a method which fits an add-on battery device to the portable computer, whenever necessary. For example, Japanese Unexamined Patent Publication (Kokai) No. 8-76898 and No. 8-76887 disclose a structure capable of removably fitting a battery pack to a portable computer. However, such a portable computer is more bulky even when the add-on battery device is not fitted than those portable computers which have similar function but do not have the function of the add-on battery device.

One of the fitting technologies of the add-on battery prepares a groove and a rail so that the add-on battery device can be slidably fitted onto the portable computer. According to this fitting technology of the add-on battery, however, the add-on battery cannot be fitted easily once the groove undergoes deformation due to change with time.

Japanese Unexamined Patent Publication (Kokai) No. 8-76889 discloses a connection structure for an information processing apparatus in which connector shell portions for a pair of connectors are formed on the housing of an extended unit, the shell portions and the housing having formed thereon the shell portions are integrally molded from a resin material, and metal plating is applied to the entire surface.

As described above, when the tilt stand is turned up in the conventional portable computer equipped with the turn-down type tilt stand, a space remains between the bottom surface of the portable computer and the desk surface on which the portable computer is placed, and the space cannot be effectively utilized. In the conventional portable computer having a removable add-on battery, the size is greater than the portable computer having no add-on battery device function, and the portability is therefore lower.

According to the prior art technology capable of fitting the add-on battery in which the battery is fitted to the portable computer by the slide system using the groove and the rail, the add-on battery cannot be fitted easily to the portable computer, if the groove or the rail once undergoes deformation due to a change with time, and fitting becomes difficult in some cases.

SUMMARY OF THE INVENTION

It is therefore an object of the present invention to provide a portable computer which has good operability, is equipped with a removable add-on battery and has a portability equivalent to that of a portable computer having no add-on battery fitting function, though the add-on battery can be fitted.

Another object of the present invention is to provide a portable computer having an extended station which makes it possible to mount the portable computer thereon while the add-on battery is kept fitted to the personal computer main body.

According to the present invention, there is provided a portable computer equipped with an add-on battery, the computer comprising: a portable computer body having an upper surface, a lower surface and a lower front edge thereof; mounting means for detachably mounting the add-on battery on the lower surface of the portable computer body, the add-on battery having a wedge-shaped portion corresponding to a wedge-like space which is defined between the lower surface of the portable computer body and a surface on which the portable computer body is placed, when the portable computer body is placed to be inclined about the lower front edge of the portable computer body; and the portable computer body, when it is equipped with the add-on battery, being inclined in such a manner that the upper surface of the portable computer body is lower at a front edge thereof.

When the personal computer is placed on the desk surface, etc, while the add-on battery is added thereto, the upper surface of the computer main body on which the key top and operation surface are disposed is inclined so that its front side becomes lower. Therefore, operability becomes excellent. When the add-on battery is not fitted, the portable computer main body itself can be constituted into a thin notebook type. For this reason, even when the add-on battery can be fitted, the personal computer can be constituted into a thin and light-weight structure having portability equivalent to that of a portable personal computer not having the add-on battery fitting function.

The lower surface of the portable computer body has a rear region and the add-on battery has the wedge-shaped portion having a shape corresponding to the wedge-like space at least at the rear portion of the lower surface of the portable computer body. While the add-on battery is fitted, the space between the back of this portable computer and the desk surface, etc, can be effectively utilized, and a function having a high packaging density can be accomplished.

The mounting means comprises: guide means including L-shaped guide grooves along which the add-on battery is first guided toward the lower surface of the portable computer body and then guided forward with respect to the portable computer body; locking means for automatically locking the add-on battery to the lower surface of the portable computer body when the add-on battery is guided forward with respect to the portable computer body; and releasing means for releasing the locking means to allow the add-on battery to be removed from the portable computer body along the L-shaped guide grooves.

In this case, the portable computer body is provided at the lower surface thereof with pairs of left and right L-shaped guide grooves and the add-on battery has pairs of left and right pawls which can be fitted to the L-shaped guide grooves, respectively.

Accordingly, the add-on battery can be easily fitted and removed to and from the portable computer main body, and the add-on battery can be firmly fixed to the portable computer main body at the time of fitting. According to another aspect of the present invention, there is provided a portable computer comprising: a portable computer body having an upper surface, a lower surface and a lower front edge thereof; an add-on battery detachably mounted on the lower surface of the portable computer body; and an extended station on which the portable computer body is detachably mounted, while the portable computer body is equipped with the add-on battery, the extended station having a recess or an opening for accommodating therein the add-on battery.

When the portable computer is mounted to the extended station while the add-on battery is kept fitted to the computer main body, the add-on battery is accommodated inside a recess portion (or an opening) in the extended station. Therefore, the overall space can be utilized effectively, and an apparatus having a high density can be accomplished. Even when the recess portion exists in the extended station, a printed wiring board, etc, can be disposed below this recess portion and consequently, the arrangement inside the extended station can be made efficiently.

DESCRIPTION OF THE PREFERRED EMBODIMENTS

Hereinafter, preferred embodiments of a portable computer according to the present invention will be explained in detail.

Figure 1:
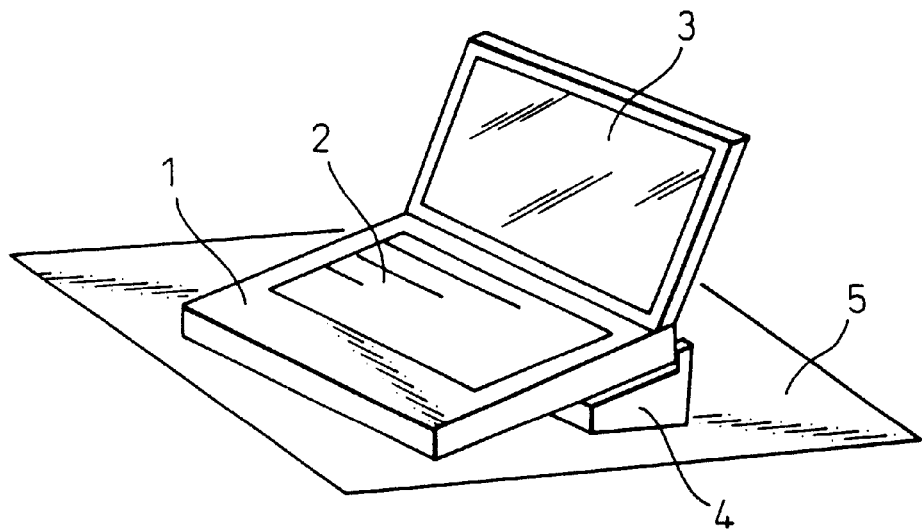
FIG. 1 is a perspective view showing a portable computer at a state where it is placed on a desk surface while an add-on battery is fitted to the portable computer main body.

FIG. 1 is a perspective view showing a state where a portable computer is placed on a desk surface 5 while an add-on battery 4 is fitted to the computer main body 1. As shown in the drawing, the add-on battery 4 is fitted to the bottom surface of the rear part of the portable computer main body 1, and when the battery 4 is fitted, the portable computer main body 1 is inclined with the lower surface of the distal end of the forward part of the main body being the axis. In consequence, the front part of the key top 2 is lower while its rear part is higher, and the input operation by the keyboard 2 becomes easy.

The add-on battery 4 has a wedge-like shape in a longitudinal direction in such a manner as to fill the space between the bottom surface of the portable computer 1 and the surface 5 on which it is placed. Therefore, under a state where the add-on battery 4 is fitted to the portable computer 1, the total capacity of the portable computer having the add-on battery fitted thereto is increased by an amount, i.e., volume or size, which is approximately equal to the capacity, i.e., volume or size, of the add-on battery 4, and thus the space between the bottom surface of the portable computer 1 and the surface 5 on which this portable computer 1 is placed does not become a useless space but can be utilized effectively. Under the state where the add-on battery 4 is removed from the portable computer main body 1, on the other hand, the total capacity is reduced by a capacity, i.e., an amount approximately equal to the capacity of the add-on battery 4 in comparison to the case where it is fitted.

Figure 2:
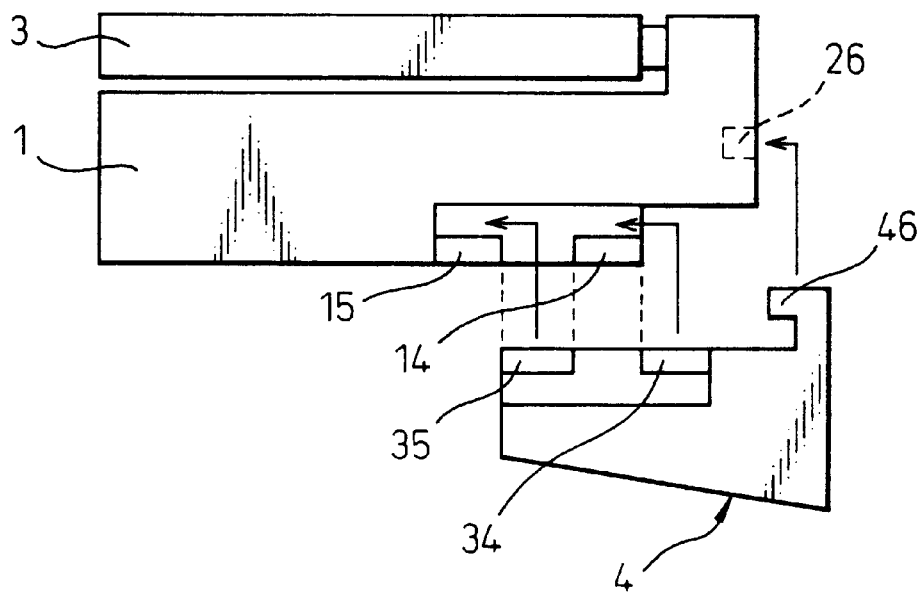
FIG. 2 is a schematic side view showing the fitting and removing state of the add-on battery to and from the portable computer main body 1.
Figure 3:
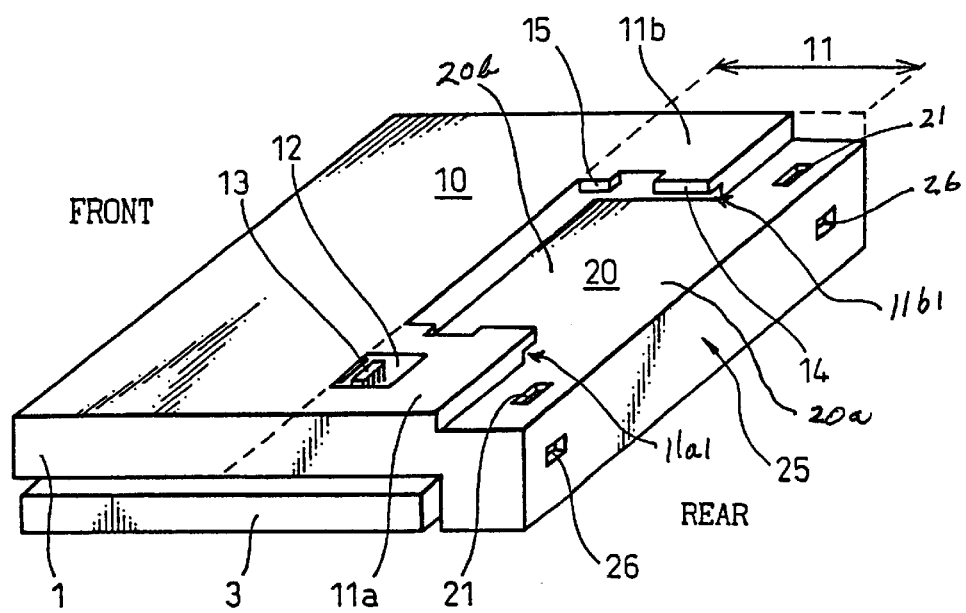
FIG. 3 is a perspective view when the portable computer main body is viewed with its bottom surface facing up.
Figure 4:
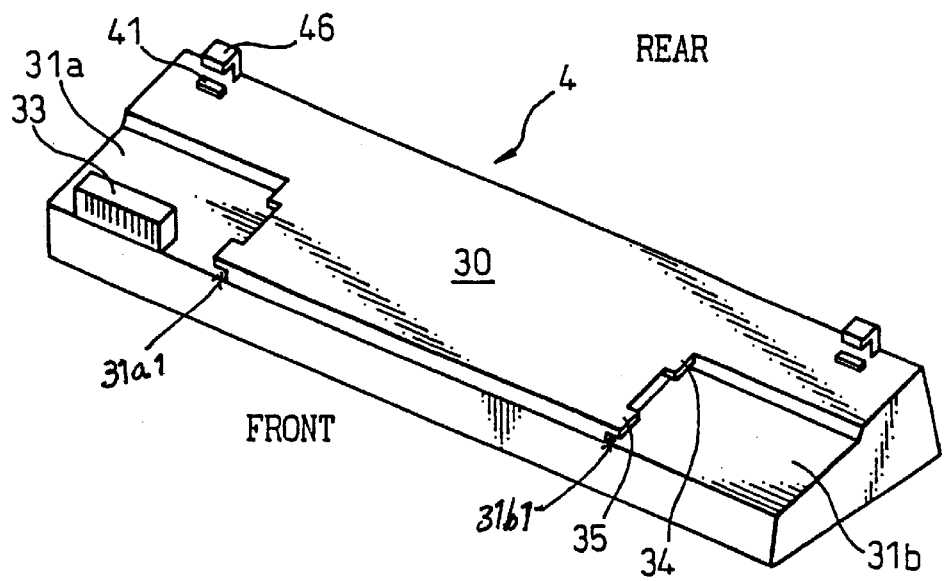
FIG. 4 is a perspective view of the add-on battery.

FIG. 2 is a schematic side view showing the fitting/removing state of the add-on battery to and from the portable computer main body 1. FIG. 3 is a perspective view showing the portable computer main body with its bottom facing up, and FIG. 4 is a perspective view of the add-on battery.

In FIG. 3, a rear area 11 of the bottom surface 10 of the portable computer main body 1 is defined as a fitting/removing area of the add-on battery 4. A recess portion 12 for disposing a power connector is formed inside the add-on battery fitting/removing area 11 (for example, inside an area 11a), and another power connector 13 is disposed on the internal front side of this recess portion 12. By the way, a sliding cover is provided to the recess portion 12. When no add-on battery 4 is fitted, the recess portion 12 is closed and no power connector 13 inside the recess portion 12 can be seen from outside.

The add-on battery fitting/removing area 11 is a recessed area 20 of a T-shaped recessed configuration recessed from the bottom surface 10 and comprising a first portion 20a of the full width of, and extending from, the rear surface 25 to spaced side portions 11a and 11b and a second portion 20b, extending continuously from the first portion 20a toward the front surface. Two pairs of spaced pawls 14 and 15 extend laterally inwardly of the center, second portion 20b of the recessed area 20 from the side areas 11a and 11b, respectively parallel to and spaced from the second portion 20b and together therewith defining engaging slots 11a1 and 11b1. A pair of recesses 21 are formed on opposite end portions of the first portion 20a of the recessed area 20 for locking the add-on battery 4.

A pair of escape holes 26 for locking are further disposed on opposite end portions of the rear surface 25 of the portable computer main body 1.

Referring now to FIG. 4, the add-on battery 4 includes a surface 30 which comes into contact with the recessed surface 20, which is recessed from the bottom surface 10 of the portable computer main body 1, when the battery is fitted to the main body 1, and a pair of recessed surfaces 31a and 31b which are formed at front positions on opposite end portions of this surface 30 and correspond to the areas 11a and 11b of the portable computer main body 1, respectively. The spaced recessed surfaces 31a and 31b configure the remaining portion of the surface 30 to be of a raised, or protruding, T-shaped configuration mating the T-shaped recessed configuration of the recessed area 20 of the bottom surface 10 of body 1.

A power supply connector 33 is disposed on one recessed surface 31a in such a manner as to correspond to the power connector 13 of the portable computer main body 1 when the add-on battery 4 is fitted to the portable computer main body 1.

Two pairs of pawls 34 and 35 which correspond to the two pairs of pawls 14 and 15 on the side of the portable computer main body 1 extend laterally outwardly from edges of a center portion of the surface 30 which extends to the front of the add-on battery 4, spaced from and parallel to the pair of recessed surfaces 31a and 31b, respectively and together therewith defining corresponding engaging slots 31a1 and 31b1 mating the engaging slots 11a1 and 11b1.

A pair of lock pawls 41 are disposed on opposite ends at the rear part of the surface 30 in such a manner as to correspond to the pair of lock recesses 21 of the portable computer main body 1. As will be later described, these lock pawls are normally biased by a spring in a projecting direction, though they can be compressed against the spring.

Furthermore, a pair of projecting pawls 46 that have an L-shaped cross-section and protrude forward are disposed at the positions of the rear end portion of the add-on battery 4 at the back of the pair of lock pawls 41 in such a manner as to correspond to the positions of the pair of escape holes 26 for locking.

Next, the fitting operation of the add-on battery 4 to the portable computer main body 1 will now be explained. First, the main power switch (not shown) of the portable computer main body 1 is turned OFF, and any other external power source, such as an, AC adaptor (not shown), is removed from the main body 1, if it has been connected to the portable computer main body 1, as is customary in the art.

The cover (not shown) of the recess 12 on the back of the portable computer main body 1 is opened, and the add-on battery 4 is positioned towards the back of the portable computer main body 1 and fitted so that the power connector 33 of the add-on battery 4 can be fitted into the recess 12 of the portable computer main body 1. At this time, the pawls 34 and 35 of the add-on battery 4 are passed through the gaps between the pairs of pawls 14 and 15 of the portable computer main body 1 and moved relatively to each other through the respective, mating engaging slots 11a, 11b, and 31a1, 31b1, in the direction of the long leg of the L-shaped arrow in FIG. 2, perpendicular to the opposed, lower main surface of the body 1 and upper main surface of the battery 4, whereby the state shown in FIG. 7 can be attained.

Figure 7:
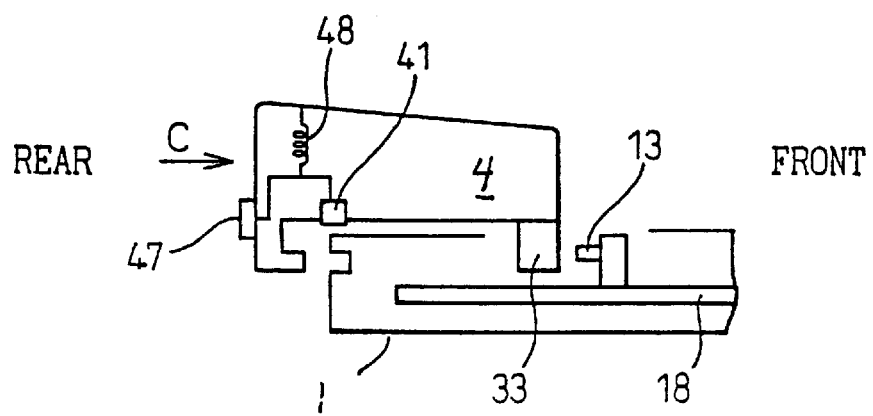
FIG. 7 is a sectional view showing a state when the add-on battery is removed from the portable computer main body.

Under the state shown in FIG. 7, the add-on battery 4 is pushed forward to the left in FIG. 2, as indicated by the short leg of the "L-shaped" arrows in FIG. 2, and with respect to the portable computer main body 1, as also indicated by an arrow C in FIG. 7 so as to fit the power connector 33 of the add-on battery 4 to the power connector 13 on the printed board 18 of the portable computer main body 1. The mating and projecting, or raised, T-shaped upper surface 30 of the battery 4 (as seen in FIG. 4) is received in the T-shaped recess 20 in the bottom surface 10 of the main body 1 (as seen in FIG. 3) and the same are matingly engaged and moved relatively to each other, in the L-shaped path described above, to engage the battery 4 with the main body 1.

Consequently, the projecting portions 46 of the add-on battery 4 (FIG. 4) fit into the pair of escape holes 26 for locking on the rear surface 25 of the portable computer main body 1 (FIG. 3) and restrict the main body 1 in the vertical direction. The pair of lock pawls 41 of the add-on battery 4 are caused to project into the pair of recesses 21 of the portable computer main body 1 by the respective springs 48 (FIG. 6) and lock the add-on battery 4 to the portable computer main body 1. Accordingly, the add-on battery 4 is restricted from any back and forth movement with respect to the portable computer main body 1 and is locked at that position. Further, the pawls 34 and 35 of the add-on battery 4 are caught by the pawls 14 and 15 of the portable computer main body 1, respectively, and firmly fix the relative vertical positions of the add-on battery 4 and the portable computer main body 1. When the power switch (not shown) is turned ON under this state, the add-on battery 4 can be used.

Next, the removing of the add-on battery 4 from the portable computer main body 1 will now be explained. In the same way as in the fitting operation, the main power switch (not shown) of the portable computer main body 1 is first turned OFF, and any other external power source, such as the AC adaptor (not shown), if any, is removed from the personal computer main body 1.

Figure 6:
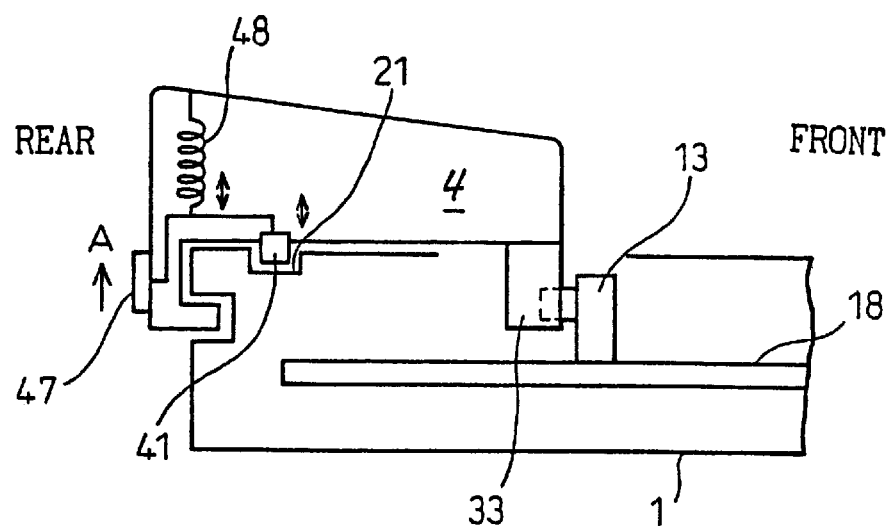
FIG. 6 is a sectional view showing a state where the add-on battery is fitted to the portable computer main body.

Next, as shown in FIG. 6, the pair of lock releasing pawls 47 disposed on the rear surface of the add-on battery 4 are slid in the direction of the arrow A against the springs 48. The pair of lock releasing pawls 47 are interconnected to the pair of lock pawls 41, respectively, and operate integrally with the latter. Therefore, the pair of lock pawls 41 escape from the pair of recesses 21, respectively, of the portable computer main body 1, and the lock is thus released.

Under this state, when the add-on battery 4 is slid in the direction opposite to the direction of the arrow C shown in FIG. 7 with respect to the portable computer main body 1 and is pulled down, the power connector 33 of the add-on battery 4 leaves (i.e., is disconnected) from the power connector of the portable computer main body 1 as shown in FIG. 7, and the pair of projecting portions 46 of the add-on battery 4 also leave (i.e., escape from) the pair of escape holes 26 on the rear surface 25 of the portable computer main body 1.

Therefore, under the state shown in FIG. 7, the add-on battery 4 can be removed from the portable computer main body 1 by pulling the add-on battery 4 from the portable computer main body 1.

Figure 8:
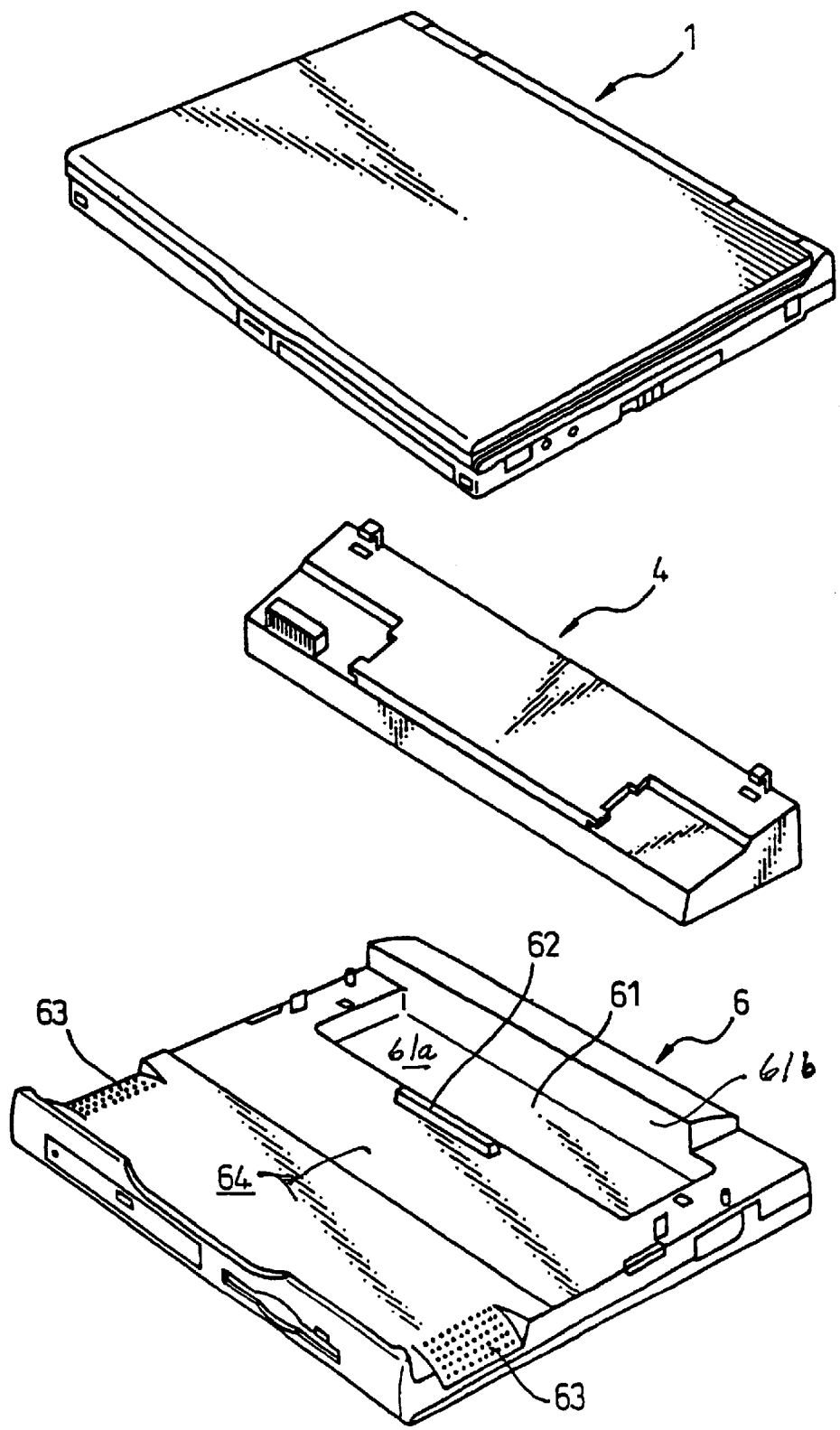
FIG. 8 is a perspective view showing a state where the portable computer main body, the add-on battery and the extended station are not fitted.
Figure 9:
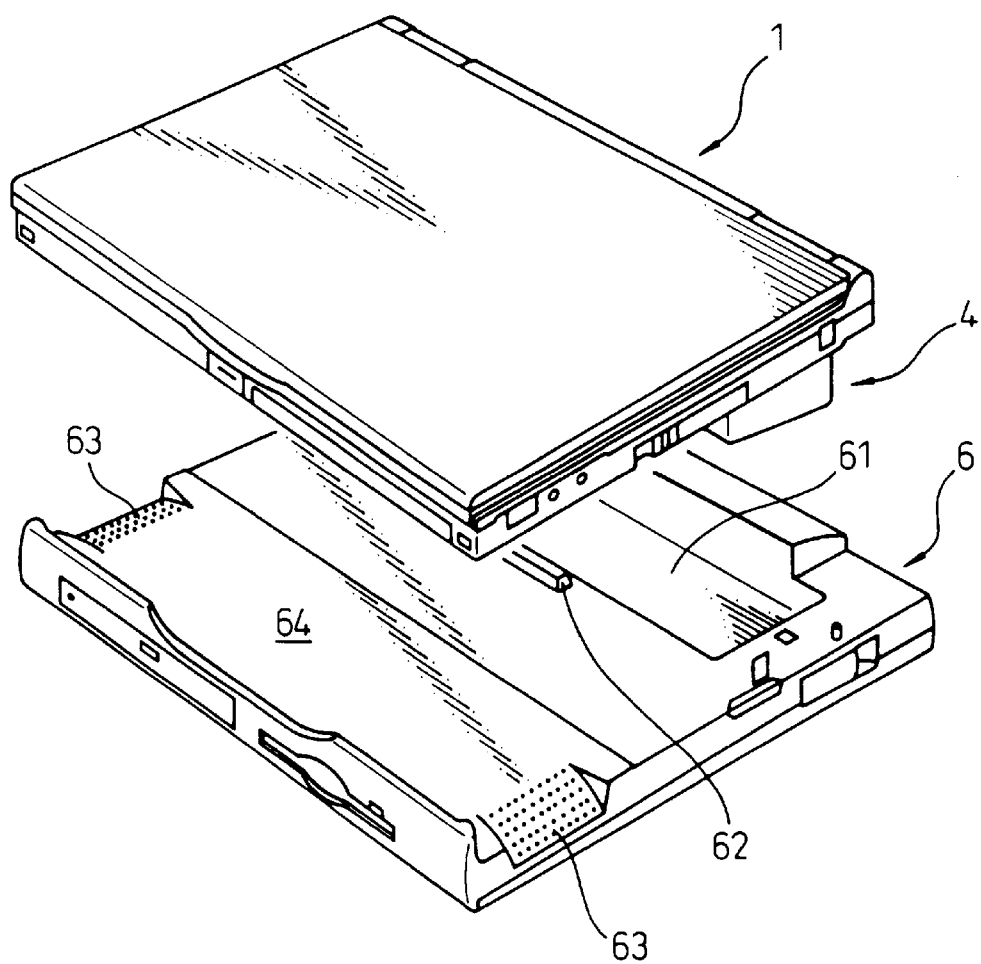
FIG. 9 is a perspective view showing a state where the add-on battery is fitted to the portable computer main body.
Figure 10:
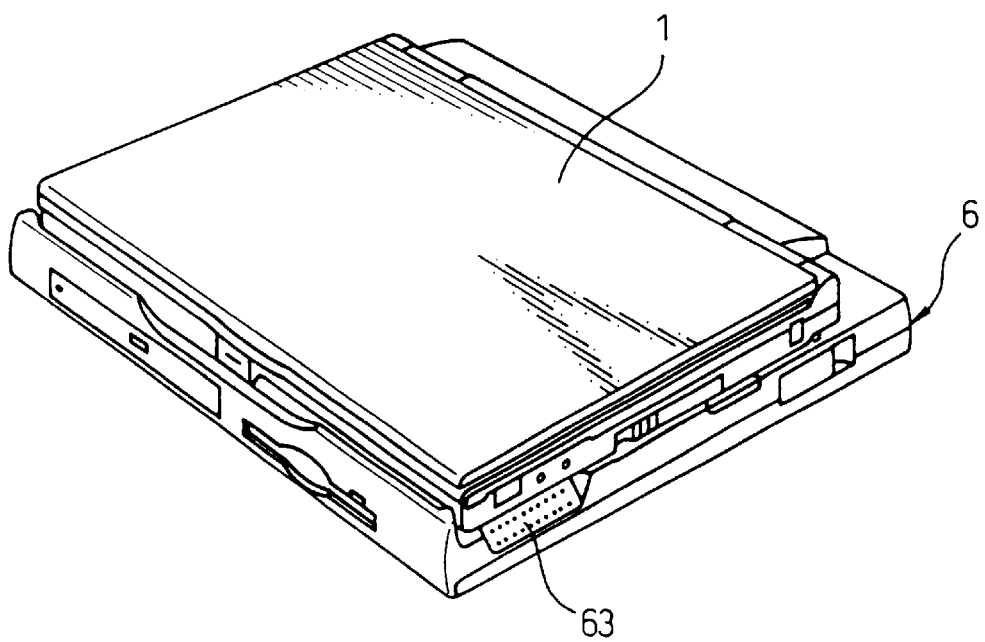
FIG. 10 is a perspective view showing a state where the portable computer main body with the add-on battery is further fitted to the extended station from the state shown in FIG. 9.

FIG. 8 is a perspective view showing the portable computer main body 1, the add-on battery 4 and the extended station 6. FIG. 9 is a perspective view showing the state where the add-on battery 4 is fitted to the portable computer main body 1 and FIG. 10 is a perspective view showing the state where the battery 4 and the computer main body 1, as fitted together, are further fitted to the extended station.

The add-on battery 4 can be fitted to and removed from the portable computer 1 as described above. Furthermore, the present invention makes it possible to mount the portable computer main body 1 to the extended station while the add-on battery 4 is fitted to the computer main body 1. For this purpose, the extended station 6 is provided with a recess 61 for accommodating the add-on battery 4. Since this recess 61 is not a mere opening but is a recess having, i.e., defined by, a bottom surface 61a which is typically planar and has a surrounding, generally upright sidewall 61b extending, or projecting, therefrom to an upper main surface 64 of the extended station 6a; a wiring pattern (not shown) such as a printed circuit board for supplying and transmitting power and signals between the front and rear areas of the extended station 6 can be disposed below the surface 61a of this recess 61, and effective utilization of the space can be accomplished. The sidewall 61b thus forms a passageway which guides the battery 4 into, and thereby to be accommodated at least in part within, the recess 61, when the portable computer body to which the battery is attached is being mounted on the extended station. When so mounted, the battery 4 is positioned between the portable computer body 1 and the extended station 6 and supports the portable computer body 1 on the extended station 6. The sidewall also guides the battery 4 when escaping from the recess 61 as the portable computer body, with the battery 4 attached thereto, is removed from the extended station 6.

Figure 5:
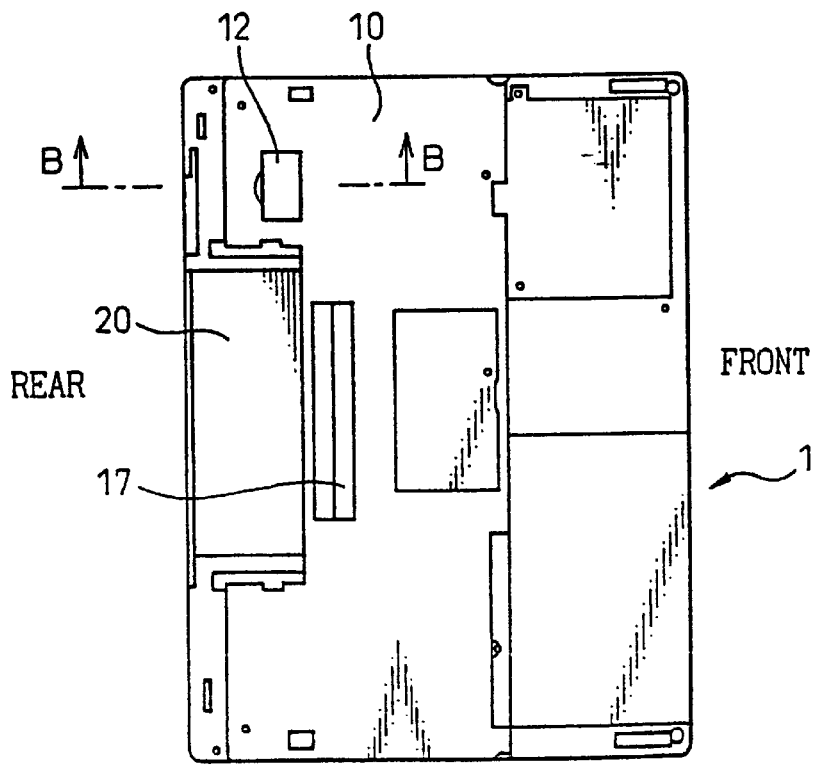
FIG. 5 is a plan view of the back surface of the portable computer.

By the way, when the portable computer main body 1 is fitted to the extended station 6, the connector 17 (see FIG. 5) disposed on the back of the portable computer main body 1 fits to the connector 62 of the extended station 6, and electrical connection is established between them.

Speakers 63 are disposed on both sides of the front portion of the extended station 6. These speakers 63 are inclined downward towards both side edges. Therefore, thin speakers 63 can be effectively disposed. When the portable computer main body 1 is fitted, the bottom of the main body 1 comes into contact with the upper surface 64 of the extended station 6. However, since the speakers 63 on both sides are inclined, gaps are defined between the portions of the speakers 63 and the bottom surface of the portable computer main body 1, and the speaker sound can be effectively diffused.

According to the present invention, as described above, when the portable computer is placed on the desk surface, etc, while the add-on battery is fitted thereto, the upper surface of the portable computer main body is inclined in such a fashion that its front portion becomes lower. Therefore, operability becomes excellent. When no add-on battery is fitted, the portable computer main body itself can be constructed into a thin notebook type computer. Even though the add-on battery can be fitted thereon, the portable computer can have a portability equivalent to that of portable computers not having the add-on battery fitting function. Under the state where the add-on battery is fitted, the gap between the back of the portable computer and the desk surface, etc, can be effectively utilized, and a function having a high packaging density can be accomplished.

The add-on battery can easily be fitted to and removed from the portable computer main body and can be firmly fixed to the main body at the time when it is fitted, and its fitting/removing operation can be done stably for a long time.

In a type which is equipped with the extended station, if the portable computer main body 1 having the add-on battery 4 mounted thereto is fitted to this extended station 6, the add-on battery 4 can be accommodated inside the recess portion 61 of the extended station 6. Therefore, the space can be effectively utilized as a whole, and an apparatus having a high density can be accomplished. Even though the recess portion 61 exists in the extended station 6, a printed wiring board, etc, can be disposed below the wall 61a of this recess portion 61, and the internal arrangement inside the extended station 6 can efficiently be made.

It should be understood by those skilled in the art that the foregoing description relates only to preferred embodiments of the disclosed invention, and that various changes and modifications may be made to the invention without departing from the spirit and scope thereof.

What is claimed is:

1. A portable computer comprising:
   a portable computer body having an upper surface, a lower surface and a lower front edge thereof;
   a battery detachably mounted on said lower surface of the portable computer body and transportable therewith; and
   an extended station on which said portable computer body, with said battery attached thereto on the lower surface thereof, is detachably mounted, said extended station having an accommodating part accommodating therein said battery and such that said battery is positioned between the portable computer body and the extended station and supports the portable computer body on the extended station.

2. A portable computer as set forth in claim 1, wherein said lower surface of the portable computer body has a rear region and said battery has a wedge-shaped portion, at least at said rear portion of the lower surface of the portable computer body, when said battery is attached to said portable computer body.

3. A portable computer as set forth in claim 1, wherein:
   said portable computer body defines, on the lower surface thereof, a guide portion along which said battery is first guided toward the lower surface of said portable computer body and then guided forward with respect thereto; and
   said portable computer body further comprises a lock to lock said battery to the lower surface of said portable computer body when said battery is guided forward with respect to said portable computer body.

4. A portable computer as set forth in claim 3, wherein:
   the guide portion includes pairs of left and right guide grooves; and
   said battery has pawls that respectively are received in the left and right guide grooves.

5. A portable computer as set forth in claim 3, wherein said battery further has a release mechanism to release the lock, thereby allowing said battery to be removed from said portable computer body along the guide portion.

6. A portable computer as set forth in claim 1, wherein:
   said portable computer body defines, at the lower surface thereof, pairs of left and right guide grooves; and
   said battery has left and right pawls that respectively are received in the left and right guide grooves.

7. The portable computer claimed in claim 1, wherein said accommodating part is an opening.

8. The portable computer claimed in claim 1, wherein said accommodating part is a recess.

9. A portable computer, comprising:
   a portable computer body having an upper surface, a lower surface and a lower front edge thereof;
   a battery detachably mountable on the lower surface of said portable computer body and transportable with the portable computer body when mounted thereon; and
   an extended station having an upper surface and defining a mounting surface thereon on which said portable computer body is detachably mounted, said extended station having an accommodating portion accommodating therein the battery while said portable computer body, having said battery mounted thereon, is mounted on said mounting surface and such that said battery is positioned between the portable computer body and the extended station and supports the portable computer body on the extended station.

10. A portable computer as set forth in claim 9, wherein:
    the lower surface of said portable computer body has a rear portion and said battery has a wedge-shaped portion disposed adjacent to the rear portion of the lower surface of said portable computer body.

11. A portable computer as set forth in claim 9, wherein:
said portable computer body defines, on the lower surface thereof, a guide portion along which said battery is first guided toward the lower surface of said portable computer body and then guided forward with respect thereto; and
said portable computer body further comprises a lock mechanism to lock said battery to the lower surface of said portable computer body when said battery is guided forward with respect to said portable computer body and such that said battery is positioned between the portable computer body and the extended station and supports the portable computer body on the extended station.

12. A portable computer as set forth in claim 11, wherein said battery further has a release mechanism to release the lock, thereby allowing said battery to be removed from said portable computer body along the guide portion.

13. A portable computer as set forth in claim 11, wherein:
the guide portion includes left and right guide grooves; and
said battery has pawls that respectively are received in the guide grooves.

14. An information processing apparatus, comprising:
an information processing apparatus body; and
an electronic device having an upper mounting surface and releasably receiving said information processing apparatus body thereon and an accommodating part releasably receiving therein a battery releasably connected to a lower surface of the information processing apparatus body and such that said battery is positioned between the portable computer body and the extended station and supports the portable computer body on the extended station.

15. The information processing apparatus claimed in claim 14, wherein a connector, connecting said electronic device and said information processing apparatus body, is provided at said mounting surface.

16. The information processing apparatus claimed in claim 14, wherein said information processing apparatus is a portable computer.

17. The information processing apparatus claimed in claim 14, wherein said electronic device extends a function of said information processing apparatus.

18. An information processing apparatus, comprising:
an information processing apparatus body;
a battery releasably connectable to a lower surface of the information processing apparatus body;
an electronic device having a mounting surface, located at an upper surface portion of the electronic device, releasably receiving thereon said information processing apparatus body and an accommodating part releasably receiving said battery therein and such that said battery is positioned between the portable computer body and the extended station and supports the portable computer body on the extended station.

19. The information processing apparatus claimed in claim 18, wherein said accommodating part is provided at said mounting surface.

20. The information processing apparatus claimed in claim 18, wherein a connector connecting said electronic device and said information processing apparatus body is provided at said mounting surface.

21. The information processing apparatus claimed in claim 18, wherein said information processing apparatus is a portable computer.

22. The information processing apparatus claimed in claim 18, wherein said electronic device extends a function of said information processing apparatus.

23. An information processing apparatus, comprising:
an information processing apparatus body;
an electronic device having a mounting surface to mount said information processing apparatus body and releasably receiving said information processing apparatus body on said mounting surface;
a battery detachably mounted on said lower surface of the portable computer body and transportable therewith;
said information processing apparatus body mounting said battery to a lower surface of said information processing apparatus body; and
said electronic device having an accommodating portion accommodating therein said battery when said information processing apparatus body, having said battery mounted thereon, is received on said mounting surface of said electronic device and such that said battery is positioned between the portable computer body and the extended station and supports the portable computer body on the extended station.

24. The information processing apparatus claimed in claim 23, wherein said accommodating part is provided at said mounting surface.

25. The information processing apparatus claimed in claim 23, wherein said mounting surface is located at an upper surface of said electronic device.

26. The information processing apparatus claimed in claim 23, wherein said accommodating part is an opening.

27. The information processing apparatus claimed in claim 23, wherein said accommodating part is a recess.

28. The information processing apparatus claimed in claim 23, wherein a connector connecting said electronic device and said information processing apparatus body is provided at said mounting surface.

29. The information processing apparatus claimed in claim 23, wherein said electronic device is an expansion station.

30. The information processing apparatus claimed in claim 23, wherein said information processing apparatus is a portable computer.

31. An information processing apparatus, comprising:
an information processing apparatus body;
an electronic device having a mounting surface on which to mount said information processing apparatus body and releasably receiving said information processing apparatus body on said mounting surface;
a battery adapted to be mounted to a lower surface of said portable computer body; and
said electronic device having an accommodating part accommodating said battery when said information processing apparatus body, with said battery mounted thereon, is releasably received on said mounting surface of said electronic device and such that said battery is positioned between the portable computer body and the extended station and supports the portable computer body on the extended station.

32. The information processing apparatus claimed in claim 31, wherein said accommodating part is provided at said mounting surface.

33. The information processing apparatus claimed in claim 31, wherein said mounting surface is located at an upper surface of said electronic device.

34. The information processing apparatus claimed in claim 31, wherein said accommodating part is an opening.

35. The information processing apparatus claimed in claim 31, wherein said accommodating part is a recess.

36. The information processing apparatus claimed in claim 31, further comprising a connector, at said mounting surface, electrically connecting said electronic device and said information processing apparatus body.

37. The information processing apparatus claimed in claim 31, wherein said electronic device is an expansion station.

38. The information processing apparatus claimed in claim 31, wherein said information processing apparatus is a portable computer.

39. A portable computer, comprising:
a portable computer body;
an extended station on which the portable computer body is mountable;
the portable computer body having a bottom surface to which a battery supplying electric power to the portable computer body is attachable; and
the extended station having an accommodating part receiving the battery when the portable computer body, to which the battery is attached, is mounted on the extended station and such that said battery is positioned between the portable computer body and the extended station and supports the portable computer body on the extended station.

40. A portable computer as set forth in claim 39, wherein the accommodating part is an opening.

41. A portable computer as set forth in claim 39, wherein the accommodating part of the extended station is a recess.

42. A portable computer as set forth in claim 39, wherein the mounting surface of the extended station is provided with a connector which is connected to the portable computer body when the portable computer body, to which the battery is attached, is mounted on the extended station.

43. A portable computer, comprising:
a portable computer body;
an extended station on which the portable computer body is mountable;
a battery attachable to a bottom surface of the portable computer body for supplying electric power to the portable computer body; and
the extended station having an accommodating part receiving the battery when the portable computer body, to which the battery is attached, is mounted on the extended station and such that said battery is positioned between the portable computer body and the extended station and supports the portable computer body on the extended station.

44. A portable computer, comprising:
a portable computer body;
an extended station on which the portable computer body is mountable;
the portable computer having a bottom surface to which a battery for supplying electric power to the portable computer body is attachable; and
the extended station having an upper surface and a mounting surface thereon for mounting the portable computer body and an accommodating part for receiving the battery when the portable computer body, to which the battery is attached, is mounted on the extended station and such that said battery is positioned between the portable computer body and the extended station and supports the portable computer body on the extended station.

45. A portable computer as set forth in claim 44, wherein the accommodating part is provided on the mounting surface of the extended station.

46. A portable computer as set forth in claim 44, wherein the mounting surface is provided on an upper surface of the extended station.

47. A portable computer, comprising:
a portable computer body;
an extended station on which the portable computer body is mountable;
a battery attachable to a bottom surface of the portable computer body for supplying electric power to the portable computer body; and
the extended station having an upper surface and a mounting surface thereon for mounting the portable computer body and an accommodating part for receiving the battery when the portable computer body, to which the battery is attached, is mounted on the extended station and such that said battery is positioned between the portable computer body and the extended station and supports the portable computer body on the extended station.

48. A portable computer, comprising:
a portable computer body;
an extended station on which the portable computer body is mountable;
the portable computer body having a bottom surface to which a battery, for supplying electric power to the portable computer body, is attachable; and
the extended station having a recess defined by a bottom surface and a surrounding sidewall projecting from the bottom surface to an upper main surface of the extended station, the sidewall forming a passageway accommodating the battery at least in part within the recess, when the portable computer body to which the battery is attached is mounted on the extended station and such that said battery is positioned between the portable computer body and the extended station.

49. A portable computer as set forth in claim 48, wherein the step portion comprises an opening in an upper surface of the extended station.

50. A portable computer as set forth in claim 48, wherein the step portion comprises a recess in the extended station.

51. A portable computer as set forth in claim 48, wherein the mounting surface has a connector which is connected to the body when the portable computer body, with the battery attached thereto, is mounted on the extended station.

52. A portable computer, comprising:
a portable computer body;
an extended station on which the portable computer body is mountable;
a battery for supplying electric power to the portable computer body and attachable to a bottom surface of the portable computer body; and
the extended station having a step portion projecting from the bottom surface for escaping the battery when the portable computer body, to which the battery is attached, is mounted on the extended station and such that said battery is positioned between the portable computer body and the extended station and supports the portable computer body on the extended station.

53. A portable computer comprising:
a portable computer body;
an extended station on which the portable computer body is mountable;

the portable computer having a bottom surface to which a battery for supplying electric power to the portable computer body is attachable; and the extended station having a mounting surface, for mounting thereon the portable computer body, at an upper surface of the extended station and such that said battery is positioned between the portable computer body and the extended station when the portable computer body is supported on the extended station and a recess in the upper surface having a recessed bottom surface and defining a step portion, projecting upwardly from the recessed bottom surface, for receiving the battery when the portable computer body with the battery attached thereto is mounted on the extended station.

54. A portable computer as set forth in claim 53, wherein a recess portion is provided on the mounting surface of the extended station to receive at least a part of the battery when the portable computer with the battery attached thereto is mounted on the extended station.

55. A portable computer as set forth in claim 53, wherein a step portion is provided on the upper surface of the extended station.

56. A portable computer, comprising:
a portable computer body;
an extended station on which the portable computer body is mountable;
a battery for supplying electric power to the portable computer body and attachable to a bottom surface of the portable computer body to support the portable computer body in an inclined position, relative to a horizontal support surface, for facilitating use by an operator of a keyboard of a portable computer in the body; and
the extended station having a mounting surface, for mounting thereon the portable computer body at an upper surface of the extended station and such that said battery is positioned between the portable computer body and the extended station when the portable computer body is supported on the extended station.

57. A portable computer, comprising:
a portable computer body;
an extended station on which the portable computer body is mountable;
the portable computer body having a bottom surface to which a battery is attachable; and
the extended station having:
a mounting surface on which the portable computer body is to be mounted;
an accommodation part provided on the mounting surface for receiving the battery when the portable computer body, with the battery attached thereto, is mounted on the mounting surface and such that said battery is positioned between the portable computer body and the extended station when the portable computer body is supported on the extended station; and
a connector provided on the mounting surface and connected to the portable computer body when the portable computer body is mounted on the mounting surface.

58. A portable computer as set forth in claim 57, wherein the accommodation part comprises an opening.

59. A portable computer as set forth in claim 57, wherein the accommodation part comprises a recess.

60. A portable computer, comprising:
a portable computer body;
an extended station on which the portable computer body is mountable;
a battery attachable to a bottom surface of the portable computer body; and
the extended station comprises:
a mounting surface on which the portable computer body is to be mounted,
an accommodation part provided on the mounting surface for receiving the battery when the portable computer body, with the battery attached thereto, is mounted on the mounting surface and such that said battery is positioned between the portable computer body and the extended station when the portable computer body is supported on the extended station, and a connector provided on the mounting surface and connected to the body when the portable computer body is mounted on the mounting surface.

61. A portable computer, comprising:
a portable computer body;
an extended station on which the portable computer body is mountable;
a battery for supplying an electric power to the portable computer body and attachable to a bottom surface of the portable computer body; and
the extended station comprises:
a mounting surface on which the portable computer body is to be mounted:
a step portion projecting from the bottom surface for escaping the battery, when the portable computer body to which the battery is attached is mounted on the extended station and such that said battery is positioned between the portable computer body and the extended station when the portable computer body is supported on the extended station; and
a connector provided on the mounting surface and connected to the body when the portable computer body is mounted on the mounting surface.

62. A portable computer as set forth in claim 61, wherein the step portion comprises an opening in the extended station.

63. A portable computer as set forth in claim 61, wherein the step portion comprises a recess in the upper surface of the extended station.

64. A portable computer, comprising:
a portable computer body;
an extended station on which the portable computer body is mountable;
a battery attachable to a bottom surface of the portable computer body; and
the extended station comprises:
a mounting surface on which the portable computer body is to be mounted;
a step portion projecting from the bottom surface for escaping the battery, when the portable computer body to which the battery is attached is mounted on the extended station and such that said battery is positioned between the portable computer body and the extended station when the portable computer body is supported on the extended station; and
a connector provided on the mounting surface and connected to the body when the portable computer body is mounted on the mounting surface.

* * * * *